(12) United States Patent
Menke et al.

(10) Patent No.: US 7,967,132 B2
(45) Date of Patent: Jun. 28, 2011

(54) MODULE FOR A CONVEYOR MAT AND MODULAR CONVEYOR MAT

(75) Inventors: Cornelis Hendrik M. Menke, Delft (NL); Gijsbertus Johannes Verduijn, Terheijden (NL)

(73) Assignee: Rexnord Flattop Europe B.V., 's-Gravenzande (NL)

( * ) Notice: Subject to any disclaimer, the term of this patent is extended or adjusted under 35 U.S.C. 154(b) by 476 days.

(21) Appl. No.: 11/579,847

(22) PCT Filed: May 11, 2005

(86) PCT No.: PCT/NL2005/000356
§ 371 (c)(1),
(2), (4) Date: Feb. 28, 2008

(87) PCT Pub. No.: WO2005/110897
PCT Pub. Date: Nov. 24, 2005

(65) Prior Publication Data
US 2008/0210528 A1 Sep. 4, 2008

(30) Foreign Application Priority Data
May 13, 2004 (NL) .................................. 1026194

(51) Int. Cl.
*B65G 17/06* (2006.01)
(52) U.S. Cl. .................. 198/853; 198/850; 198/851
(58) Field of Classification Search .................. 198/850, 198/851, 853
See application file for complete search history.

(56) References Cited

U.S. PATENT DOCUMENTS

| 5,247,789 A | * | 9/1993 | Abbestam et al. ............... 59/78 |
| 5,573,105 A | | 11/1996 | Palmaer |
| 5,906,270 A | * | 5/1999 | Faulkner ..................... 198/853 |
| 6,216,854 B1 | * | 4/2001 | Damkjær et al. ............ 198/853 |
| 2004/0011627 A1 | | 1/2004 | Palmaer et al. |

FOREIGN PATENT DOCUMENTS

| EP | 0493349 | 7/1992 |
| GB | 1463226 | 2/1977 |
| WO | 2005080234 A1 | 1/2005 |

OTHER PUBLICATIONS

International Search Report corresponding to PCT/NL2005/000356, under date of mailing of Sep. 2, 2005.

* cited by examiner

*Primary Examiner* — Gene Crawford
*Assistant Examiner* — Yolanda Cumbess
(74) *Attorney, Agent, or Firm* — Quarles & Brady LLP

(57) ABSTRACT

A module (1) for a conveyor mat, comprising a body part (2) which is provided, on front and rear sides (3, 6) operatively extending transversely to the conveying direction (p), with hinge loops (5A, 5B) mutually spaced apart at mutual intermediate distances (4A, 4B), and an underside (7) operatively cooperating with a guideway. The underside (7) is provided with a downwardly extending mounting frame (11) for receiving a guide element. The module (1) may be included in a modular conveyor mat, comprising a number of modules being consecutive in conveying direction, each provided with a body part extending transversely to a conveying direction, having hinge loops reaching forwards and rearwards in the conveying direction, while the hinge loops of consecutive modules cooperate and are coupled by means of hinge pins, and at least one of the modules is designed with a mounting frame.

18 Claims, 4 Drawing Sheets

MODULE FOR A CONVEYOR MAT AND MODULAR CONVEYOR MAT

This invention relates to a module for a conveyor mat, comprising a body part which is provided, on front and rear sides operatively extending transversely to a conveying direction, with hinge loops spaced apart at mutual intermediate distances, and an underside operatively cooperating with a guideway.

Such a module is generally known and is used in a modular conveyor mat comprising a number of modules being consecutive in conveying direction, while, of consecutive modules, hinge loops reaching forwards and rearwards in conveying direction cooperate and are coupled by means of hinge pins extending transversely to the conveying direction.

In some cases, the module is provided at its underside with a guide element. During use, the guide element then cooperates with a guide on the conveyor track, for instance formed by a lateral side or underside of a wear strip arranged in the conveyor track.

The guide element can then cooperate with the guide to guide the conveyor mat straight along the conveyor track, for instance at places where, due to products being slid over, a force transverse to the conveying direction is exerted on the modules of the mat.

Further, what can be prevented by means of a guide element is the mat being pulled radially inwards when passing through a bend in the conveying plane. Also, as the mat passes through a bend, the guide element can prevent a radially outwardly situated portion of the mat coming up off the conveyor track.

Further, when the conveyor mat is of endless design, such a guide element can serve to guide the return part hanging under the conveyor track.

Depending on the type of conveyor track, the guide element can be designed in a variety of ways. The guide element may for instance be designed as a cam having a guiding surface extending transversely or obliquely downwards from the underside. Further, the guide element may be designed with a hook part extending along the underside, spaced from the underside. However, the guide element may also be designed as a rolling element.

Since the modules are usually manufactured by injection molding, in practice, it is mostly impossible, in view of the high equipment costs, to choose the type of guide element freely, a module being commercially available only with one or two types of guide elements.

The object of the invention is to provide a module of the kind mentioned in the opening paragraph hereof, with which the freedom of choice of the guide element can be enlarged, without high equipment costs.

To that end, the module is characterized according to the invention in that the body part is provided with a mounting frame extending downwards, for receiving a guide element. By the use of a mounting frame extending downwards relative to the underside, the module can be equipped, subsequent to manufacture, with a guide element as desired. In this way, without adaptations to the mold for the module, yet a freedom of choice of the type of guide element can be realized. Furthermore, the module does not need to be made client-specific until after production, which simplifies production planning and stock control. Furthermore, the material for the module and for the guide element can be chosen to be different, allowing the module material for instance to be optimized for tensile strength, at low cost price, while the material for the guide element can be optimized for sliding properties and wear resistance.

Advantageously, the mounting frame is formed integrally with the module, for instance by injection molding the module with the mounting frame from plastic material.

The invention also relates to a modular conveyor mat provided with one or more modules which are provided, at an underside of the body part, with a downwardly extending mounting frame for receiving a guide element.

Further advantageous embodiments of the invention are described in the subclaims.

The invention will be further elucidated with reference to an exemplary embodiment which is represented in a drawing.

In the drawing.

The figures are only schematic representations of preferred embodiments of the invention which are given by way of non-limiting exemplary embodiments. In the figures, the same or corresponding parts are designated by the same reference numerals.

Figure 1:
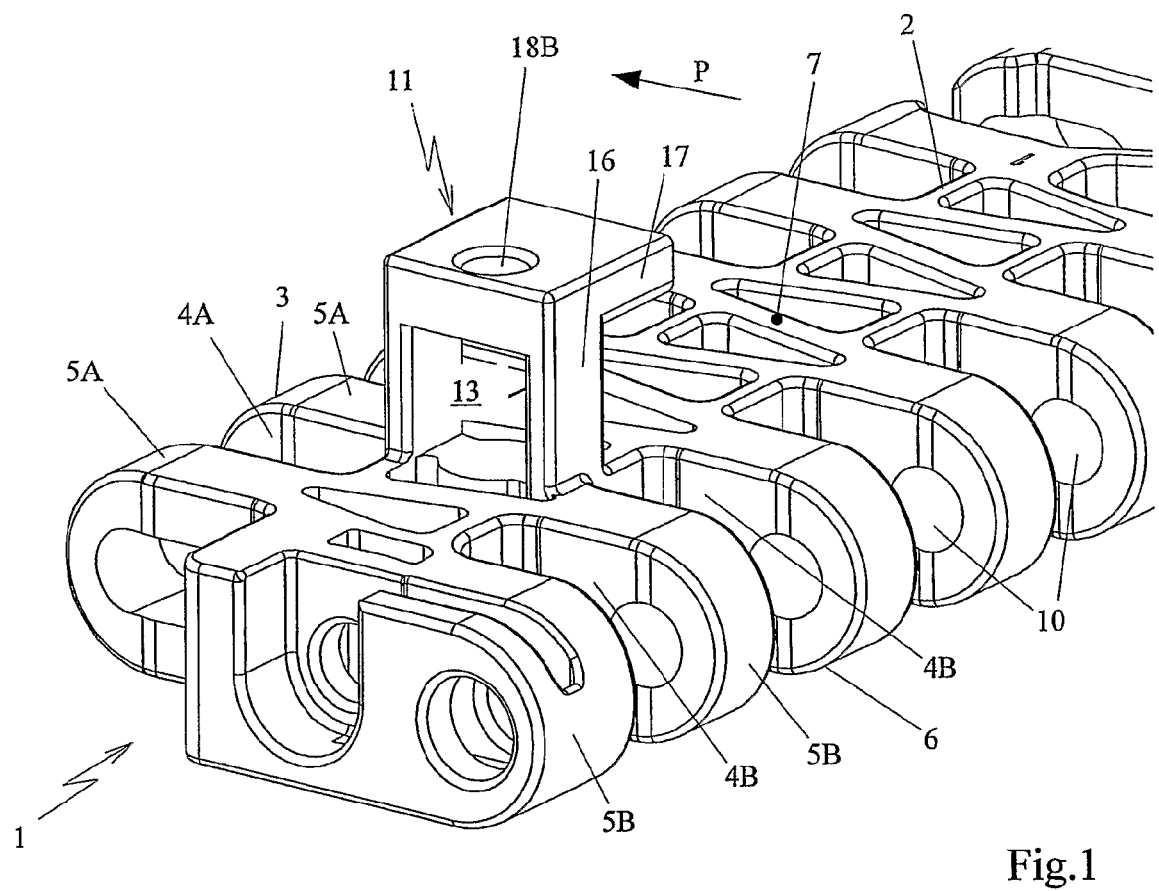
FIG. 1 shows a schematic perspective view of the underside of a module with mounting frame.
Figure 2:
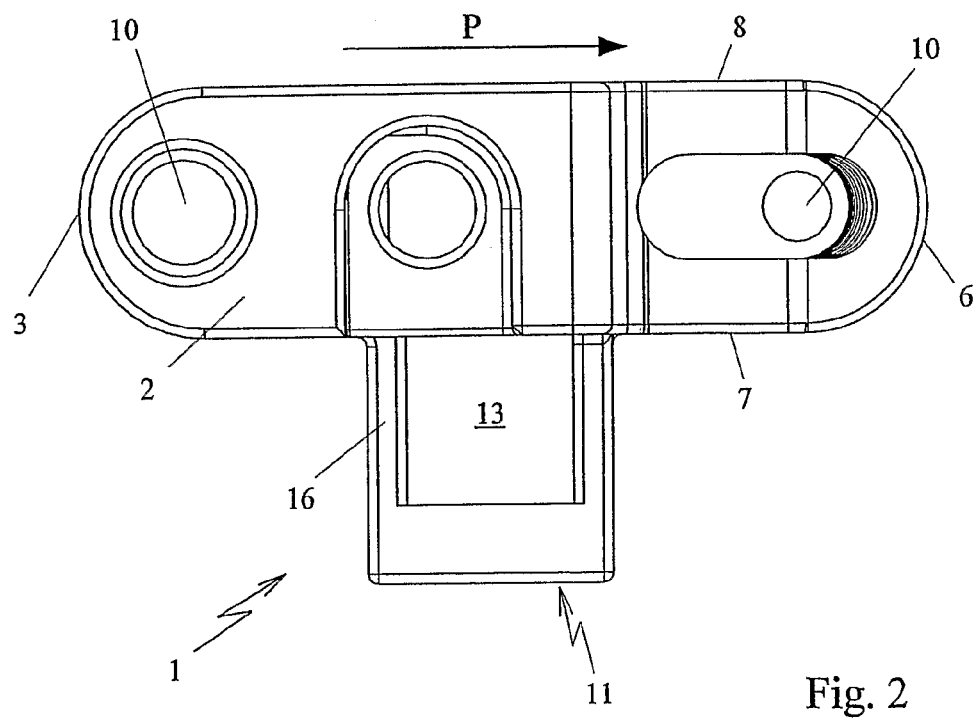
FIG. 2 shows a schematic side view of the module of FIG. 1.
Figure 3:
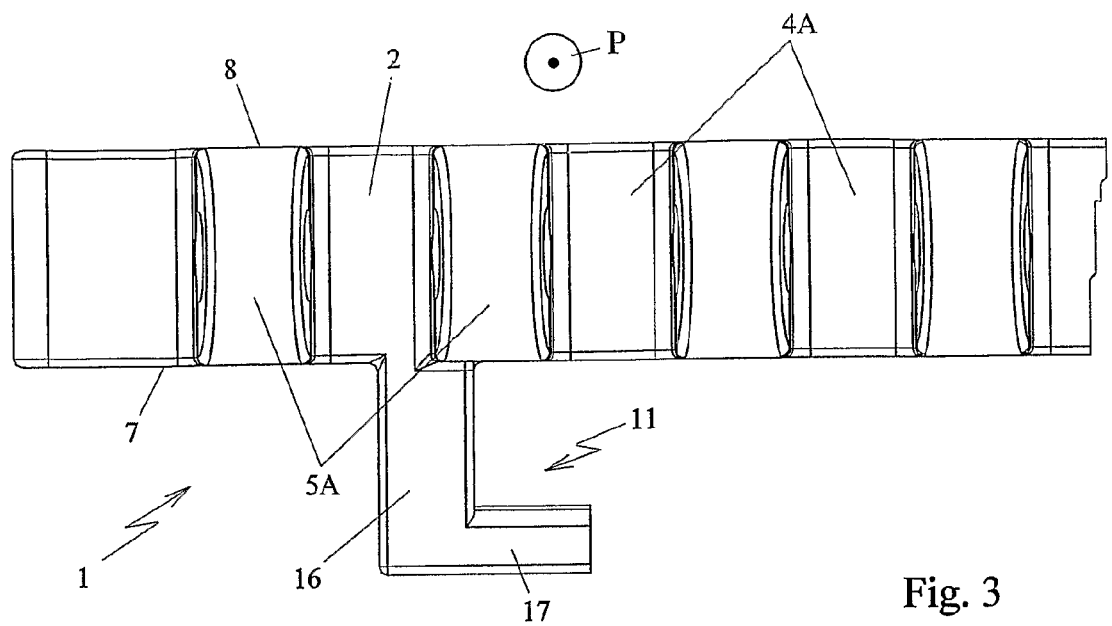
FIG. 3 shows a schematic front view of the module of FIG. 1.

Referring to the figures, in particular FIGS. 1-3, there is shown a module 1 for a conveyor mat, comprising a body part 2 which is provided, on a front side 3 operatively extending transversely to a conveying direction indicated with an arrow P, with hinge loops 5A spaced apart at mutual intermediate distances 4A. The body part 2 is further provided, on a rear side 6 operatively likewise extending transversely to the conveying direction P, with hinge loops 5B spaced apart at mutual intermediate distances 4B.

The body part 2 of the module 1 is provided with a substantially flat underside 7, operatively cooperating with the upper sides of wear strips of a guideway. The body part 2 is further provided with an upper side 8 operatively forming a conveying surface.

Figure 6:
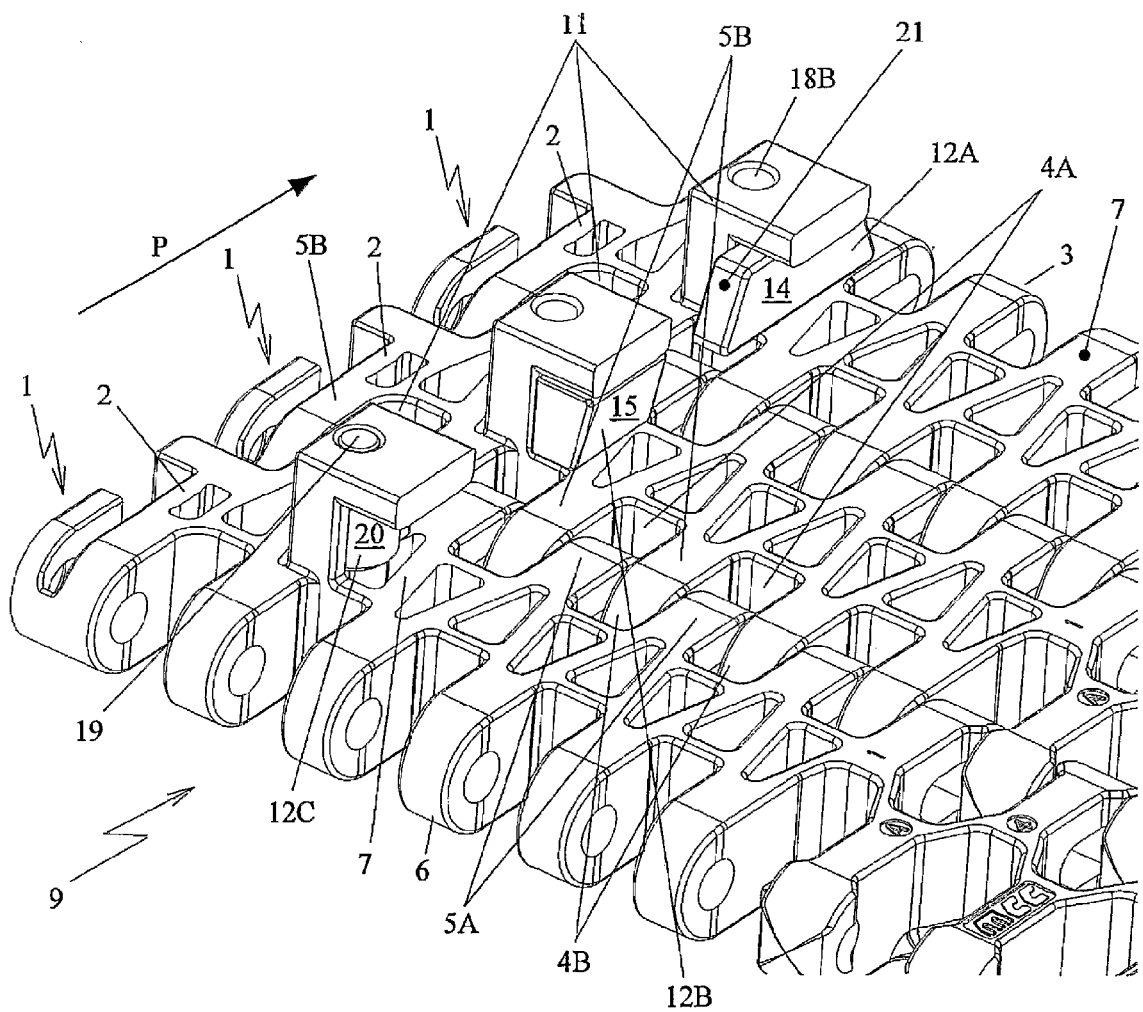
FIG. 6 shows a schematic perspective bottom view of a modular conveyor mat, in which, by way of illustration, different types of guide elements have been fitted in mounting frames of consecutive modules.

Referring in particular to FIG. 6, there is shown a modular conveyor mat 9 which is built up from three plastic modules 1 being consecutive in conveying direction P, while of consecutive modules 1 hinge loops 5A reaching forwards in the conveying direction cooperate with hinge loops 5B reaching rearwards in the conveying direction, and the hinge loops 5A, 5B of consecutive modules are coupled by means of hinge pins extending through hinge holes 10.

The module 1 is provided at its underside 7 with a mounting frame 11 extending downwards from the underside, for receiving therein a guide element 12. The mounting frame 11 is formed integrally with the body part 2 of the module 1 in that the module 1 has been manufactured from plastic material as a single injection molded product.

The mounting frame 11 defines a receiving opening 13 for receiving therein the guide element 12. As shown in FIG. 6, the guide element 12 can be designed, as desired, as a cam 12A having a guiding surface 14 extending substantially transversely downwards relative to the underside 7 of the module 1; as a guide cam 12B having a guiding surface 15 extending downwards substantially obliquely relative to the underside 7 of the module 1; or, for instance, as a rolling element 12C. It will be clear that normally speaking, in each case the same types of guide elements 12 are received in consecutive mounting frames.

The mounting frame 11 comprises a carrier part 16 extending downwards relative to the underside 7 of the module 1 and a hook part 17 extending along the underside of the module, spaced from the underside, which is carried by the carrier part 16.

As shown in FIG. 3, the mounting frame 11 is substantially L-shaped in front view. What is thus achieved is that the mounting frame, even when no guide element 12 is received in it, can already function as a so-called guide tab in that the hook part 17, by cooperation with the underside of a wear strip of the conveyor track, can hinder upward movement of the module relative to the conveyor track. Furthermore, as will be elucidated in more detail hereinbelow, a guide element 12 received in the mounting frame can be supported by means of the hook part 17.

The mounting frame 11 is substantially U-shaped in side view, with the upper ends of the legs of the U merging integrally into the body part 2 of the module 1. In this way, the carrier part 16 of the mounting frame can surround the receiving opening 13, together with a part of the underside 7, in an annular fashion, so that a guide element can be reliably received in the receiving opening 13.

Figure 4:
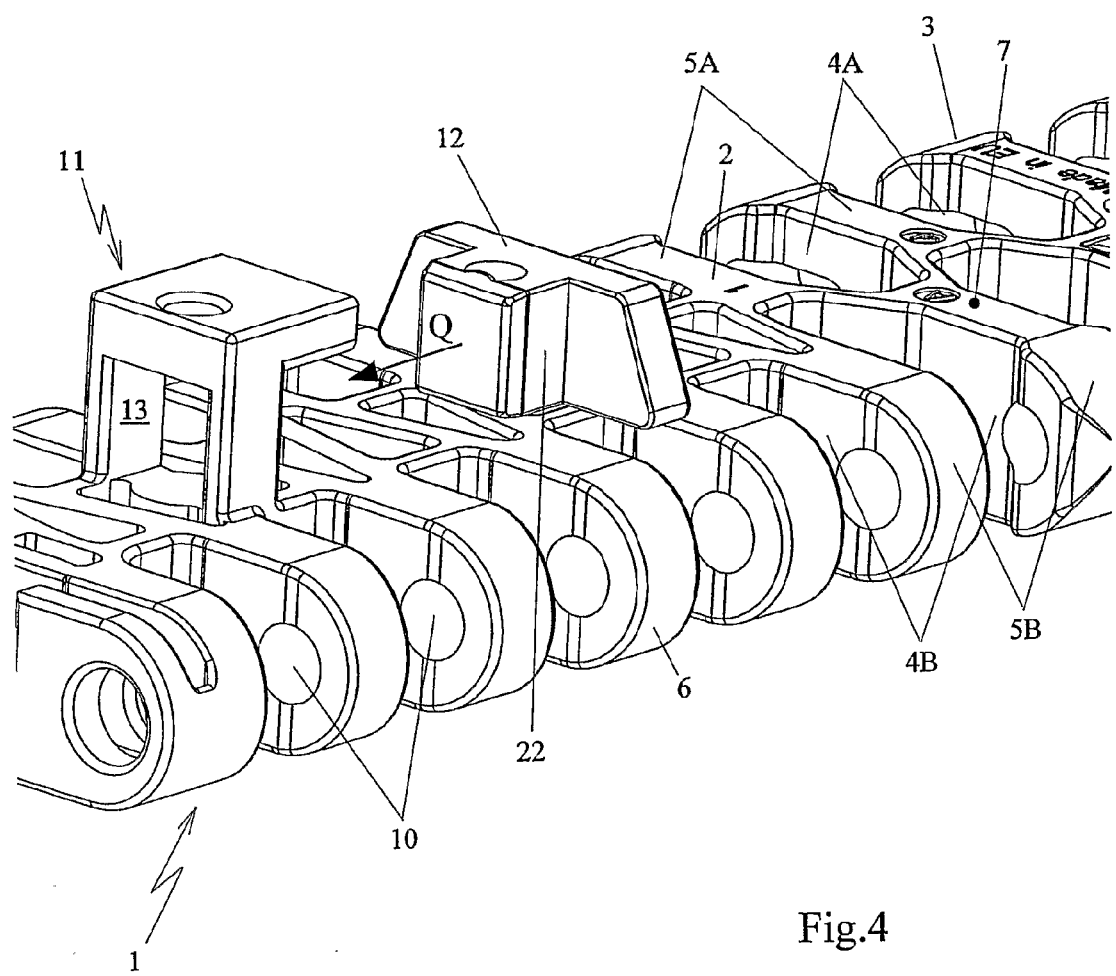
FIG. 4 shows a view of FIG. 1 while a guide element is being mounted.
Figure 5:
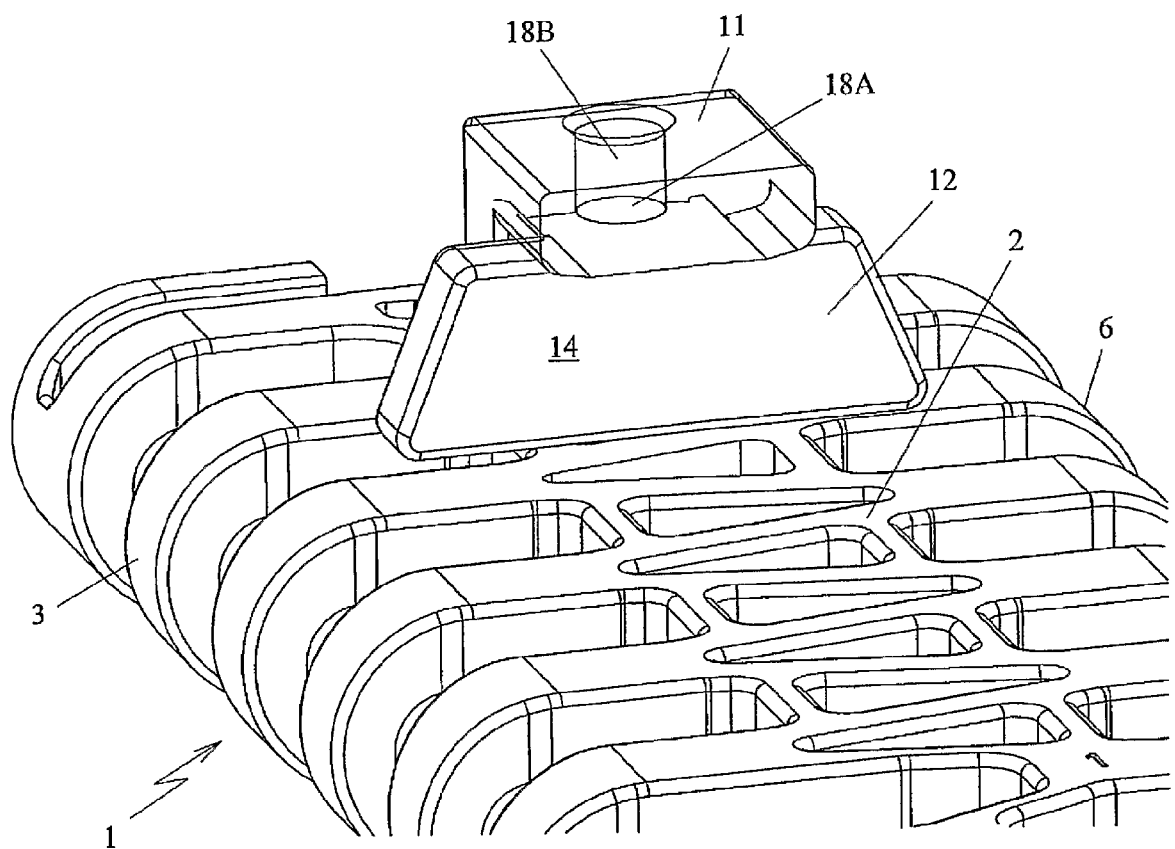
FIG. 5 shows a detail view of FIG. 4 with the guide element in mounted condition.

Preferably, the guide element 12 is detachably received in the receiving opening 13, for instance in that, as shown in FIG. 4, it has been pressed by way of a block-shaped mounting part 22 in the direction of the arrow Q into the receiving opening. The guide element 12 may for instance be locked in the receiving opening 13 in that a snap connection is provided. In FIG. 5 it is shown that such a snap connection 18 can for instance be designed as a bulge 18A on the mounting block which can cooperate with a recess 18B provided in the bottom of the U-shaped carrier part. By designing such a recess as shown as a through-hole, alternatively a pivot for roller 20 of the rolling element 12C can be journaled in it. To enhance stability of the pivot 19, a corresponding blind hole may be provided in the opposed part of the underside 7 of the body part 2 of the module 1, serving as a receiving opening for, for instance, the other end of the pivot.

Referring to FIG. 6, guide element 12B is designed as a guide cam having a guiding surface 15 extending obliquely downwards relative to the undersurface 7 of the module 1. Such a type of somewhat undercut cam is designated by those skilled in the art by the term of "bevel". The guide cam 12A, by contrast, is provided with a guiding surface 14 extending substantially transversely to the conveying surface, slightly set back relative to the hook part 17. In this way, the hook part 17 can still function as a tab. It will be clear that the guiding surface 14 can naturally be placed flush with, or actually slightly beyond, the end of the hook part 17 by varying the dimensions of the guide element 12A. In the guide element 12A, the surfaces facing forwards and rearwards in the conveying direction are provided with a bevel 21 tapering towards the middle of the module 1. In this way, consecutive modules 1 can pivot relatively far with respect to each other, while yet a relatively large guiding surface 14 is provided. The module 1 is preferably manufactured from a technical plastic such as, for instance, POM, PA or PBT, while the guide element may be made, for instance, from UHMWPE or other wear resistant materials having good sliding properties.

What is thus provided is a module for a conveyor mat, comprising a body part which is provided, at front and rear sides operatively extending transversely to the conveying direction, with hinge loops spaced apart at mutual intermediate distances, and an underside operatively cooperating with a guideway. The underside is provided with a downwardly extending mounting frame for receiving a guide element. The module may be included in a modular conveyor mat, comprising a number of modules being consecutive in conveying direction, each provided with a body part extending transversely to a conveying direction, with hinge loops extending forwards and backwards in conveying direction, while the hinge loops of consecutive modules cooperate and are coupled by means of hinge pins, and at least one of the modules is designed with a mounting frame.

It will be clear that the invention is not limited to the exemplary embodiments represented here, but that many variations are possible.

For instance, instead of the zigzag basic shape of the module represented here, it is also possible to choose, for instance, a block-shaped body part, a wave-shaped body part or actually a body part made up of plates. The conveying surface formed by the upper side of the modules may for instance be at least partly closed. Furthermore, the hinge holes in the forwardly and/or rearwardly reaching loops may be designed as slotted holes, so that the mat can pass through a bend in the conveying plane through cooperating hinge loops sliding in and out.

Furthermore, transversely to the conveying direction, a plurality of modules may be arranged next to each other and these modules may for instance be staggered relative to each other in a brick pattern.

It is also possible for consecutive modules in the conveying direction to be equipped alternately with and without mounting frame. Typically, the mounting frames will be provided on modules situated at the longitudinal edge of the mat, for instance on a line extending in conveying direction along one or both longitudinal edges. Also, the mounting frames may be arranged closer to the middle of the conveyor mat. Further, it is possible to provide a single module with a plurality of mounting frames, for instance two mutually facing mounting frames each arranged near an end of the module.

Such variants will be clear to those skilled in the art and are understood to fall within the scope of the invention as set forth in the following claims.

The invention claimed is:

1. A module for a conveyor mat, comprising:
   a body part which is provided, on front and rear sides operatively extending transversely to a conveying direction, with hinge loops spaced apart at mutual intermediate distances, and an underside;
   a mounting frame extending downwardly from said underside, wherein the mounting frame comprises a carrier part extending downwards from the underside of the module, which carries a hook part extending along the underside, spaced from the underside; and
   a guide element detachably mounted to said mounting frame beneath said underside.

2. A module according to claim 1, wherein the mounting frame is formed integrally with the body part.

3. A module according to claim 1, wherein the mounting frame defines a receiving opening for receiving the guide element.

4. A module according to claim 1, wherein the mounting frame in front view of module is substantially L-shaped.

5. A module according to claim 1, wherein the mounting frame in side view of the module is substantially U-shaped.

6. A module according to claim 1, wherein the guide element is received in the mounting frame.

7. A module according to claim 6, wherein the guide element is a guide block or rolling element.

8. A module according to claim 6, wherein the guide element is detachably received in the mounting frame.

9. A module according to claim 1 wherein the guide element is detachably mounted to the carrier part.

10. A modular conveyor mat, comprising a number of modules being consecutive in conveying direction, each provided with a body part extending transversely to a conveying direction, having hinge loops reaching forwards and rearwards in the conveying direction, while the hinge loops of consecutive modules cooperate and are coupled by means of hinge pins, and at least one of the modules includes a body part which is provided, on front and rear sides operatively extending transversely to a conveying direction, with hinge loops spaced apart at mutual intermediate distances, and an underside;

- a mounting frame extending downwardly from said underside, wherein the mounting frame comprises a carrier part extending downwards from the underside of the module, which carries a hook part extending along the underside, spaced from the underside; and
- a guide element detachably mounted to said mounting frame beneath said underside.

11. A modular conveyor mat according to claim 10, wherein the mounting frame is formed integrally with the body part.

12. A modular conveyor mat according to claim 10, wherein the mounting frame defines a receiving opening for receiving the guide element.

13. A modular conveyor mat according to claim 10, wherein the mounting frame in front view of module is substantially L-shaped.

14. A modular conveyor mat according to claim 10, wherein the mounting frame in side view of the module is substantially U-shaped.

15. A modular conveyor mat according to claim 10, wherein a guide element is received in the mounting frame.

16. A modular conveyor mat according to claim 15, wherein the guide element is a guide block or rolling element.

17. A modular conveyor mat according to claim 15, wherein the guide element is detachably received in the mounting frame.

18. A modular conveyor mat according to claim 10, wherein the guide element is detachably mounted to the carrier part.

* * * * *

UNITED STATES PATENT AND TRADEMARK OFFICE
CERTIFICATE OF CORRECTION

| | | |
|---|---|---|
| PATENT NO. | : 7,967,132 B2 | Page 1 of 1 |
| APPLICATION NO. | : 11/579847 | |
| DATED | : June 28, 2011 | |
| INVENTOR(S) | : Cornelis Hendrik M. Menke | |

It is certified that error appears in the above-identified patent and that said Letters Patent is hereby corrected as shown below:

On the title page, item: (75) Inventors "Cornelis Hendrik M. Menke, Delft" should be changed to
-- Cornelis Hendrik M. Menke, Den Haag --

Signed and Sealed this
Twentieth Day of September, 2011

David J. Kappos
*Director of the United States Patent and Trademark Office*